US006344853B1

(12) United States Patent
Knight (10) Patent No.: US 6,344,853 B1
(45) Date of Patent: Feb. 5, 2002

(54) METHOD AND APPARATUS FOR SELECTING, MODIFYING AND SUPERIMPOSING ONE IMAGE ON ANOTHER

(75) Inventor: Kevin J. Knight, Foothill Ranch, CA (US)

(73) Assignee: Alcone Marketing Group, Irvine, CA (US)

(*) Notice: Subject to any disclaimer, the term of this patent is extended or adjusted under 35 U.S.C. 154(b) by 0 days.

(21) Appl. No.: 09/479,284

(22) Filed: Jan. 6, 2000

(51) Int. Cl.[7] .............................. G06F 17/60; G06T 3/00
(52) U.S. Cl. ............................ 345/435; 705/26; 705/27
(58) Field of Search ......................... 345/435; 709/203; 705/26, 27

(56) References Cited

U.S. PATENT DOCUMENTS

| | | | |
|---|---|---|---|
| 4,675,725 A | 6/1987 | Parkyn | 348/584 |
| 4,706,075 A | 11/1987 | Hattori et al. | 345/23 |
| 4,868,552 A | 9/1989 | Chang | 345/115 |
| 5,109,272 A | 4/1992 | Kinoshita et al. | 358/500 |
| 5,130,801 A | 7/1992 | Yamaguchi | 348/14.07 |
| 5,283,560 A | 2/1994 | Bartlett | 345/113 |
| 5,357,601 A | 10/1994 | Kagawa | 345/435 |
| 5,383,111 A * | 1/1995 | Homma et al. | 705/27 |
| 5,479,597 A | 12/1995 | Fellous | 345/302 |
| 5,598,224 A | 1/1997 | Choi | 348/599 |
| 5,614,945 A | 3/1997 | Sekine et al. | 348/208 |
| 5,680,528 A * | 10/1997 | Korszun | 345/435 |
| 5,689,562 A | 11/1997 | Hassan et al. | 358/430 |
| 5,805,237 A | 9/1998 | Nakatani et al. | 348/589 |
| 5,970,471 A * | 10/1999 | Hill | 705/26 |
| 6,026,215 A * | 2/2000 | Fantone et al. | 345/435 |
| 6,083,267 A * | 7/2000 | Motomiya et al. | 703/6 |

FOREIGN PATENT DOCUMENTS

| | | |
|---|---|---|
| EP | 0677954 | 10/1995 |
| EP | 0414222 | 4/1996 |
| JP | 62166475 | 7/1987 |
| JP | 4021077 | 1/1992 |
| JP | 6027933 | 2/1994 |
| JP | 6118923 | 4/1994 |
| JP | 09220203 | 8/1997 |

OTHER PUBLICATIONS

TOMAX (www.tomaxusa.com/e-sample/).

(List continued on next page.)

Primary Examiner—Kenneth R. Coulter
(74) Attorney, Agent, or Firm—R. Lewis Gable; Cowan, Liebowit & Latman PC (57) ABSTRACT

A method of preparing a server is disclosed that supports a client system to construct and preview a composite image. The composite image comprises first and second images. The method of this invention comprises the steps of constructing at the server first and second libraries, inputting to the server data representative of the sets of the first and second images, and generating from the inputted set of first images a corresponding set of templates. Each template bears a corresponding one of the set of the first images. Next, the set of templates is loaded into the first library. Then, the set of second images is loaded into the second library. In one illustrated embodiment of this invention, the first image represents a promotional product, the second image represents a logo and the composite image is the logo superimposed on the promotional product.

37 Claims, 10 Drawing Sheets

OTHER PUBLICATIONS

BRANDERS.COM (www.branders.com).

BCEnet Design (www.hypermart.net/superimpose/).

The Virtual Family Bragbook (www.noteworthydesigns.com).

Vistech Home Page (www.mrangel.com).

Performance and accuracy experiments with 3D and 2D image overlay systems, by M. Blackwell et al., Second Annual International Symposium on Medical Robotics and Computer Assisted Surgery, MRCAS '95 1995, pp. 312–317.

Vision–based object registration for real–time image overlay, by M. Uenohara, et al., ComputerVision, Virtual Reality and Robotics in Medicine. First International Conference, CVRMed '95. Proceedings 1995, pp. 13–22.

Vision–based object registration for real–time image overlay, by M. Uenohara, et al., Computers in Biology and Medicine, vol. 25, No. 2, Mar. 1995, pp. 249–260.

Characteristics of kinoform by LCD and application to display the animated color 3D image, by K. Sato, The International Society for Optical Engineering, vol. 2176, 1994, pp. 42–9.

Doing it with mirrors; low budget stereo graphics, by A. Van Gelder, et al., The International Society for Optical Engineering, vol. 2178, 1994, pp. 68–77.

BGI bitmap image overlay processing, by R. Weili, Mini–Micro Syst. (China), vol. 14, No. 6, 1993, pp. 38–41.

Processing map and drawing data on MAP VISION, by K. Ichikawa, et al. NTT R&D, vol. 41, No. 5, 1992, pp. 609–618.

Some problems arising during the construction of a three–dimensional model of artificial and natural objects by means of a computer, by K. M. Vinogradov, Soviet Journal of Optical Technology, vo. 58, No. 11, Nov. 1991, pp. 746–749.

A general software package for the handling of medical images, by J. S. Fleming, et al., Journal of Medical Engineering & Technology, vol. 15, No. 4–5, Jul.–Oct. 1991, pp. 162–169.

Display architecture to allow rapid updating of a bit–mapped display with automatic regeneration of affected elements, by C. J. Evangelist, et al., IBM Technical Disclosure Bulletin, vol. 27, No. 1B, Jun. 1984, pp. 847–848.

Workstation transfers graphics data processing to the periphery, by F. Huller, et al., Elektronik, vol. 32, No. 9, May 6, 1983, pp. 75–79.

* cited by examiner

METHOD AND APPARATUS FOR SELECTING, MODIFYING AND SUPERIMPOSING ONE IMAGE ON ANOTHER

FIELD OF THE INVENTION

This invention relates to digital processing of a plurality of images and, in particular, the superimposing of one image on another. In one illustrative application of this invention, the digital processing occurs in the context of the Internet and on a web-site, which is accessible via a transmission link, the Internet for example, typically by users employing a browser to select and modify one or both of the sets of images before superimposing one on another. In a further application, this invention may be used to permit a customer from his/her browser to select and modify a first image in the form of a logo or trademark of a company, a geographic unit such as a country, city, state, etc., or a sports team, etc., and to superimpose that selected first image onto on a second image of a promotional product such as luggage, apparel such as a hat, writing instruments, electronic devices such as a radio and the like.

BACKGROUND OF THE INVENTION

The internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g. a HyperText Transfer Protocol ("HTTP") request). The request is forwarded to the Web server that supports that Web page. When the Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Web Servers have been programmed to permit vendors to provide a wide array products and services for sale over the Internet. A user, who is a potential purchaser, may browse one or more websites, which provide lists of products or services for sale, much like a catalogue. A purchaser may preview these lists to select a desired product or services to be purchased. When the user has completed selecting the items to be purchased, the server computer system then prompts the user to enter information to complete the ordering of the selected items. This purchase generally deals with how and where the selected items may be delivered to the purchaser and how the purchaser will pay for the selected items.

A service to be marketed over the Internet involves the superimposing of one image on another to permit the prospective purchaser to preview the composite image before buying. TOMAX USA.com (www.tomaxusa.com/e-sample/) is an example of such a service, where a second image of a logo of a business company or athletic team for example may by superimposed on a first image in the form of promotion merchandise such as a watch, clock, calculators or other electronics. Initially, a second image logo is forwarded to TOMAX. The logo may be in the form of a photograph, e.g., a black and white color separated artwork of the logo, and, in that form, would be forwarded by mail to TOMAX. Alternatively, the logo may be scanned and converted to a digital signal, before being formatted by Adobe Illustrator into an EPS format or by Adobe PhotoShop; the formatted signals are transmitted to TOMAX USA.com. If E-mailed, an indication of the PMS color also needs to be transmitted to permit the logo to be reproduced at the processing site in its precise colors. At the processing site, the received image of the logo is converted back to a hard copy, before it is assembled with the promotional product of interest and a photograph of the logo superimposed on the product is taken. In turn, the photograph is scanned and the converted, rasterized image is transmitted as an E-mail attachment to the user's browser, where it may be previewed. TOMAX USA indicates that the superimposing process will require 60 hours or perhaps less, depending on workload. In addition, a security code number is transmitted with the superimposed image to the purchaser, while the superimposed image is also uploaded to the website of TOMAX USA. The purchaser may use that security code to access on line the superimposed image from TOMAX USA's website. Similarly, the purchaser may give that security code to another person, a customer of the purchaser for example, whereby the customer may also view the superimposed image from this website.

A drawback to the technique described above is that the superimposing is performed photographically and, as a result, requires a significant amount of time. Further, the TOMAX USA process is not capable of adjusting the color of either the image of the logo and/or the promotional product. Further, there is no provision for changing the relative size of the logo with regard to the product. It is appreciated that the size of the product may vary; for example, the product may take the form of a piece of luggage or a relatively small product such as a ball point pen. In order to fit a logo on a particular product, it is necessary to adjust the size of the logo to fit that of the product. Still further, it is necessary to place the logo on the product in accordance with the configuration and size of the product. In the example of the ball point pen, the size of the logo is selected to be relatively small, and the logo is oriented along the axis of the pen. On the other hand if the logo is placed on luggage, the size of the logo would normally be larger. The logo could be disposed in a number of positions relative to the luggage, e.g., parallel to its bottom surface or diagonally across a side surface, i.e., the logo would be disposed to intersect the bottom surface at an angle. In short, the above described website does not permit the purchaser to adjust on line the relative size, color or location of the logo with respect to the promotional product.

SUMMARY

Accordingly, it is an object of this invention to digitally process and superimpose a second image on a first image and to display the composite image, whereby a prospective purchaser can preview the product bearing the logo represented by the composite image.

It is one object of this invention to permit the purchaser to change and view the color of the first image, e.g., a logo, and the second image, e.g., a promotional product, before making a selection of the color for these images from a selection of colors.

It is a further object of this invention to permit the purchaser to change the relative size of the first image with respect to the second image and to preview these changes, before finalizing the relative sizes of the first and second images.

It is a still further object of this invention to permit the purchaser to change and preview the relative orientation of the second image with respect to the first image, before finally determining the relative orientation.

It is another object of this invention to permit on line access to a website that is connected to the Internet, whereby the purchaser may vary image parameters such as the color, the relative size and the relative orientation of the images of the logo to the promotional product, before finally setting these parameters.

In accordance with these and other objects of the invention, this invention provides a method of preparing a server to support a client system to construct and preview a composite image. The composite image comprises first and second images. The method of this invention comprises the steps of constructing at the server first and second libraries, inputting to the server data representative of sets of the first and second images, and generating from the inputted set of first images a corresponding set of templates. Each template beares a corresponding one of the set of the first images. Next the set of templates is loaded into the first library. Then, the set of second images is loaded into the second library.

In one illustrative embodiment of this invention, the first image represents a promotional product, the second image represents a logo and the composite image is the logo superimposed on the promotional product.

In a further aspect of this invention, the method of this invention includes the step of creating and storing in memory a set of first parameters that defines a certain characteristic of the first image, and a set of second parameters that define a certain characteristic of the second image. In an illustrated embodiment of this invention, each of the first and second parameters defines a particular color, and a further parameter defines the relative size of the second image as compared to the first image.

In another aspect of this invention, the method of this invention comprises the further step of preparing a first webpage bearing indicia designed to be actuated by a user of the supported client system to select one of the set of first images, embedding the selected first image into the webpage to be downloaded to and displayed by the supported client system, creating and storing in memory a set of first parameters that define a certain characteristic of the first image, and preparing a second webpage bearing indicia designed to be actuated by the user of the supported client system to select one of the set of first parameters to define that characteristic of the selected first image.

In a still further aspect of this invention, the method of this invention comprises the steps of preparing a third webpage bearing indicia designed to be actuated by the user of the supported client system to select one of the set of second images, of embedding the selected second image into the third webpage to be downloaded to and displayed by the supported client system, of creating and storing in memory a set of second parameters that define a certain characteristic of the second image, and of preparing the third webpage to bear further indicia to be actuated by the user of the supported client system to select one of the set of second parameters to define that characteristic of the selected second image.

In a further aspect, the method of this invention permits a client system to construct and preview a composite image, which includes first and second images. First and second libraries are provided at a server supporting the client system to store respectively sets of the first and second images. The method is carried out by the steps of establishing a communication session over a communication link between the server and the client system, and of facilitating a user at the client system during the course of said communication session to select from the first library a selected first image and to select from the second library a selected second image. Then, a template is generated bearing the selected first and second images, before the template is embedded into a webpage. Finally, the webpage is downloaded to the client system to display the composite image at the client system.

BRIEF DESCRIPTION OF THE DRAWINGS

The forgoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIGS. 3A–F illustrate a series of screens or webpages that appear on the purchaser's browser to respectively permit the purchaser to preview and to select the various parameters of a logo and the promotional product such as the color of each and the relative size and orientation of the logo to the product.

DETAILED DESCRIPTION OF A PREFERRED EMBODIMENT OF THE INVENTION

Figure 1:
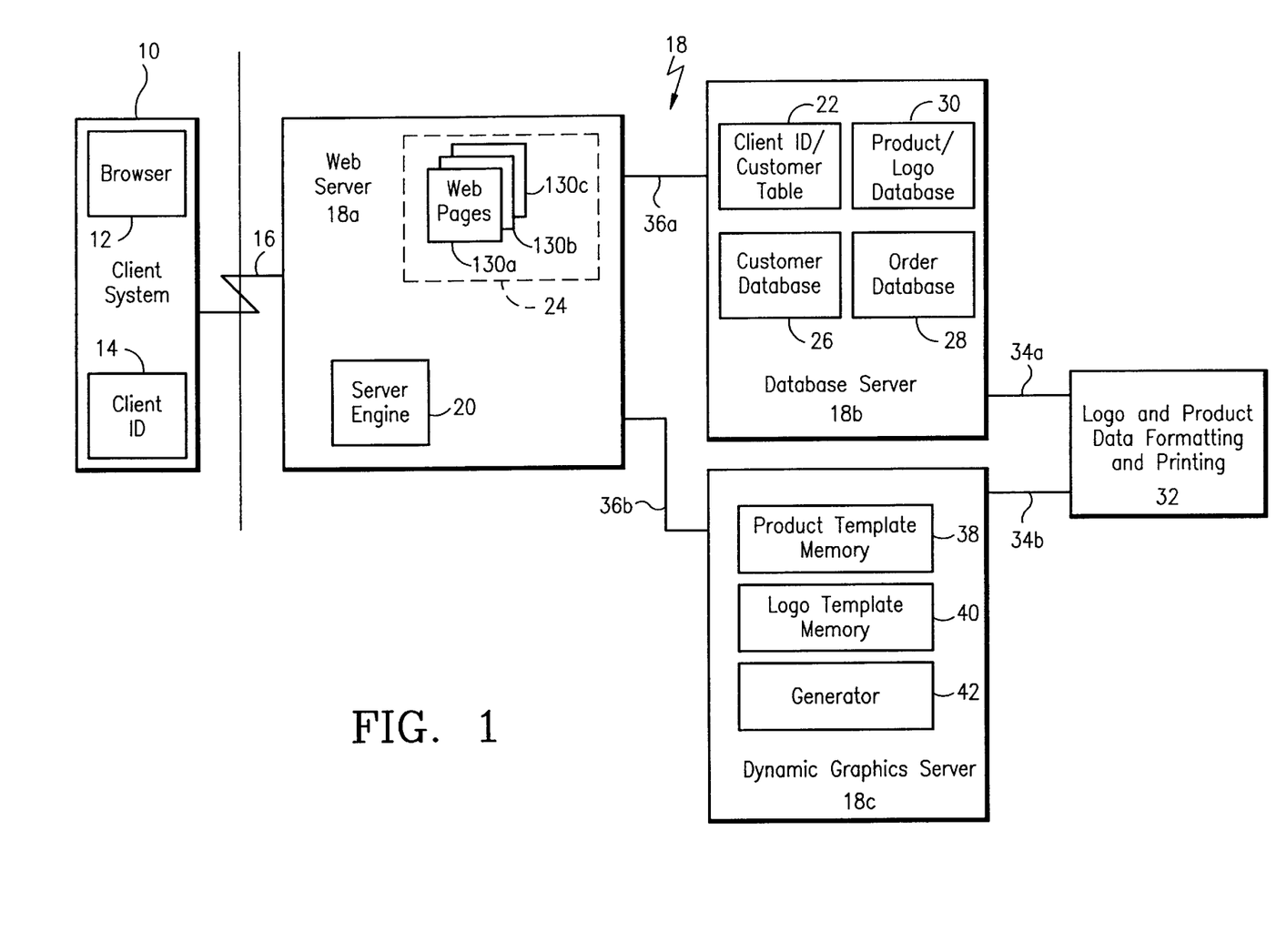
FIG. 1 is a functional block diagram illustrating how a purchaser's browser and a server of the website to be accessed by the purchaser's browser are connected to and by a communication link to each other.

Referring now to the drawings and in particular to FIG. 1, there is shown an embodiment of this invention which permits a purchaser or user, using his/her client system 10, to access a server system 18 by exchanging messages over a communication link 16, which in one example of this invention may take the form of the Internet. The client system 10 comprises a browser 12 and its assigned client identifier, which is known as a "cookie". The client identifier is stored in a file 14. Though only a single client system 10 is illustrated in FIG. 1, it will be appreciated that there would typically be a plurality of client systems 10, which are connected to the communication link 16 and capable of transmitting messages over the link 16 to the server system 18. In one embodiment of this invention, the purchaser initiates on the browser 12 a communication session with the server system 18 by assigning and sending over the link 16 his/her client identifier to the client system 18. From then on, the client system 10 includes its client identifier with all messages sent to the server system 18 so that the server system 18 can identify the particular client system 10 from which the message was sent.

The server system 18 comprises, as shown in FIG. 1, a web server 18a, a data base server 18b, and a dynamic graphics server 18c. The server system 18 is front ended, as described above, in that the purchaser can access the system 18 by sending requests from the browser 12 via the communication link 16 to the web server 18a, while data in the form of images of the different promotional products and logos are back ended, i.e., this data is input to the server system 18 via a block 32. As will be described in detail with respect to FIGS. 2A and 2B, data reflective of the logo images and the product images are obtained, formatted and input by the block 32. The processing of block 32 is effected by the software illustrated in FIGS. 2A and 2B, as executed by a developer work station processor (not shown) that may be positioned at any convenient location, not necessarily at the site of the server system 18 as shown in FIG. 1. Further, the logo data may be entered by a purchaser on his/her client system 10 to be transmitted over the communication link 16 to the web server 18a for processing. Such use of the client server 10 permits a purchaser to have his or her particular logo to be processed, e.g., superimposed on a selected promotional product, in accordance with the teachings of this invention.

Figure 3B:
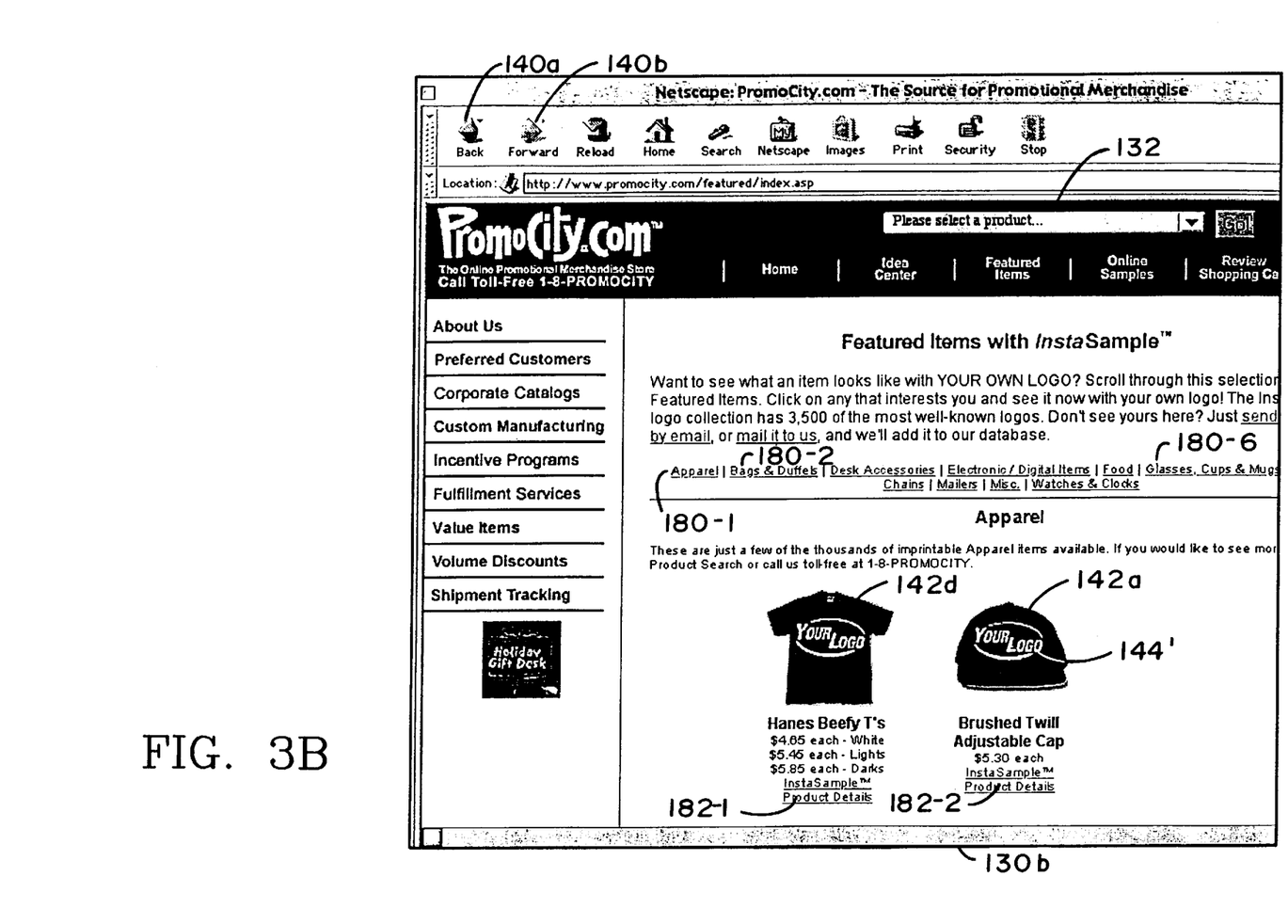
Figure 3C:
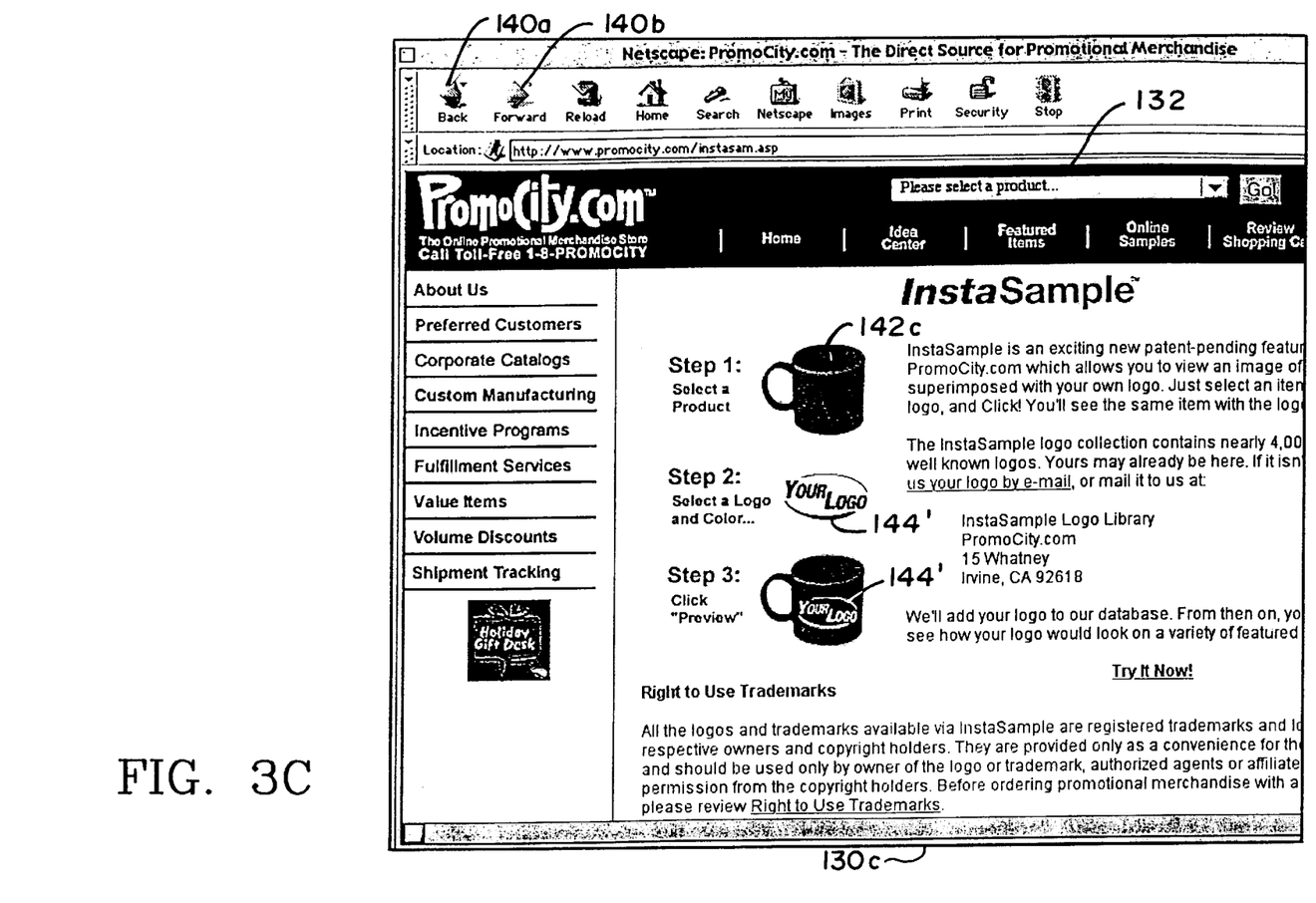

This invention relates generally to superimposing a second image onto a first image. In an illustrative embodiment of this invention, the second image takes the form of a logo, a trademark or any other image or visual message provided by the purchaser or end user. The logo may refer to a commercial product, a geographic location such as a city, a state or a nation, an athletic team or the like. A logo is illustrated in FIGS. 3A, B, C, D and F, where it is identified by a numeral 144; the logo 144 is superimposed on a first image which, for example, may take the form of a promotional product 142. Such a product 142 may take the form, for example, of a cap 142a, a golf ball 142b, a cup 142c, a shirt 142d or the like.

In turn as shown in FIG. 1, the web server 18a comprises a server engine 20, and a database 24 for storing a plurality of web pages 130a, b, c etc. As is well know in the art, the server engine 20 processes the purchaser messages from the browser 12 in the form of HTTP requests to access web pages 130 identified by URLs and, in turn, transmits the requested web pages 130 to the requesting system 10, where they are displayed, e.g., on a CRT (not shown).

The database server 18b comprises a database 22 for storing a client identifier/customer table, a customer database 26, an order database 28 and a product/logo database 30. The customer database 26 may contain for example customer information for various purchases or potential purchasers. The customer information includes purchaser-specific order information such as the name of the customer and billing information. The order database 28 stores an entry for each order that has not yet been transmitted to a purchaser. The client identifier/purchaser table 22 contains a mapping from each client identifier, which is a globally unique identifier that uniquely identifies a client system 10, to the purchaser last associated with that client system 10. The product/logo data base 30 includes separate storage areas for receiving respectively data reflective of the different promotional products and logos which may be processed in accordance with this invention. As will be illustrated in and described with respect to FIGS. 3A–F, a second image of a purchaser selected logo 144 will be superimposed onto a first image of a purchaser selected promotional product 142, Though the database server 18b has been described in FIG. 1 in terms of a plurality of distinct data bases 22, 26, 28 and 30, it would be appreciated by one skilled in the art that one memory or another combination of memories could store this data.

Figure 4:
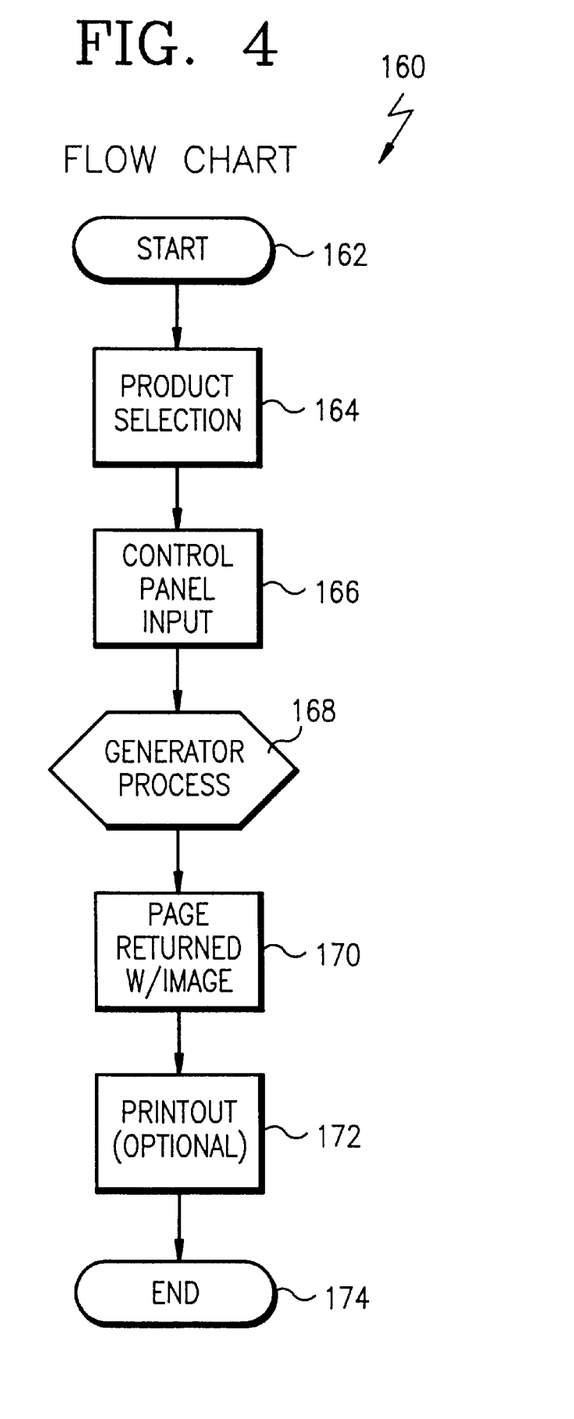
FIG. 4 is a flow diagram which illustrates the process by which the purchaser uses his/her browser to access the website and its server system as shown in FIG. 1, which hosts the computer software for permitting the purchaser to select and configure the logo on the promotional product in accordance with the teachings of this invention.

Still referring to FIG. 1, the dynamic graphics server 18c comprises a product template memory 38, wherein a plurality of templates, each carrying one first image of a promotional product 142, are stored, a logo template memory 40, wherein a plurality of templates, each carrying one second image of a logo 144, are stored, and a generator 42 which carries out the processing identified by the numeral 160 as shown in FIG. 4 and, in particular by the step 168 thereof. Note that both of the product/logo database 30, and the product template memory 38 and the logo template memory 40 arc needed. The product/logo database 30 stores the lists of all of the products and logo that the system 18 can handle. As will be explained, pull down menus reflecting these lists stored in the database 30 are provided to the user, whereby he/she can select one of each of the products and the logos for later processing, The template memories 38 and 40 are separately needed in order to permit the processing and, in particular, the superimposing of a logo image on a product image as will be explained below.

Further as will be shown and explained with respect to the flow diagram of FIG. 4, the programming for the client system 10 and the server system 18 permits the purchaser to set up a communication session between the client system 10 and the sever system 18, whereby the purchaser can communicate with the server system 18 to preview a number of each of the logos 144 and the promotional products 142, to control the selection of the color of each of the logos 144 and products 142, and to control the relative size and position of the logo 144 with respect to its promotional product 142.

Figure 2A:
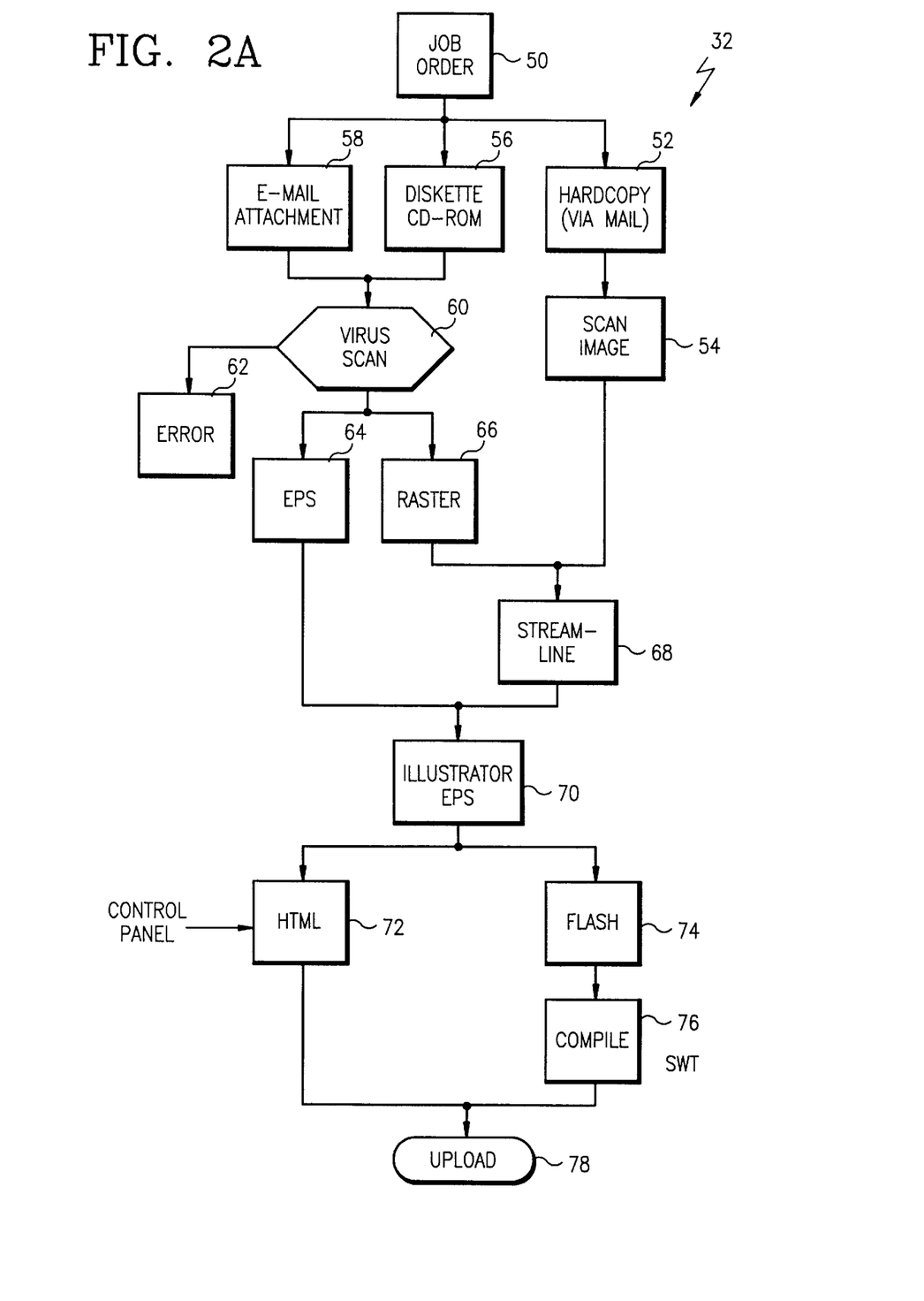
FIGS. 2A and 2B are flow diagrams, which are loaded on the server system for respectively inputting and processing a variety of logos to populate a logo library and a variety of promotional products to populate a product library in a data base of the server system shown in FIG. 1.

In FIG. 2A, there is shown a flow diagram of the steps of the process, that was generally identified by the block 32 as shown in FIG. 1, for inputting and formatting data indicative of the second images. In particular, data representing a plurality of second images reflective of different logos 144 may be so processed in the block 32 and inputted to the database server 18b and, in particular, to its database 30, wherein a data library of logos is constructed. Thus, the purchaser may, as will be described, preview and select one second image or logo 144 from this library to be superimposed on the promotional product 142. The second or logo image may be transmitted by different conduits to the site where the processing 32 is performed by any of the well know computers such as a Macintosh or Windows personal computer as programmed in accordance with the process illustrated in FIG. 2A. Though the site of the processing 32 may be in the vicinity of the server system 18 as shown in FIG. 1, it would be appreciated by one skilled in the art that such a site may be disposed at a distance from the server system 18 and the signals derived from the processing 32 transmitted thereto by any conventional means. For example, a hard copy of a logo 144 could be mailed in step 52 to the processing site, where at the hard copy is scanned in step 54 to input data in a raster format. Alternatively, the logo data may be stored in a diskette or ROM, which is delivered in step 56 to the processing site. In a third embodiment, the logo data is Emailed in step 58 from the client's system 10 to the site of the processing 32.

Both the Emailed data and that carried by the diskette are scanned in step 60 to remove possible viruses; if step 60 fails to remove the virus, an error alarm is generated in step 62. The data carried by the diskette is converted in step 66 to a raster format. The rasterized data from steps 66 and 54 are applied to step 68, which converts the rasterized data from both sources into Encapsulated Post Script (EPS) data. EPS data is formatted in mathematical terms, whereby the data can be readily scaled without loss of resolution. As will be described, the logo data will be scaled whereby the size of the logo 144 may selectively set by the purchaser relative to the size of the promotional product 142. In one illustrative embodiment, step 68 may be implemented by the software marketed by Adobe under its trademark, "SteamLine". Step 68 converts the rasterized data outputted from the steps 54 and 66 into data, which defines the outline of each character in terms of a series of lines. Each of these lines is a vector, which is defined by a set of coordinates.

The EPS data derived from each of steps 68 and 64 are further processed in step 70, which is a program that permits an operator to edit the outline of the inputted character and to reset the coordinates of the component lines accordingly. The rasterized data outputted by the steps 54, 60 and 66 is a collection of a fixed number of dots or pixels, whose image upon expansion decreases in resolution. By contrast, the EPS data outputted by step 70 is of a vector format, which mathematically defines the image to permit its expansion without loss of resolution. Step 70 also scales the logo 144 to a common size, which may be confined by a given figure of selected dimensions, e.g., a 3"×3" square. The problem is that the logos 144 to be inputted and formatted by the process 32 come in all different sizes. In particular, step 70 reduces the logos 144 of different sizes to a common default size and, in particular, determines the largest dimension of the logo 144 before the logo 144 is oriented so that its largest dimension fits within the 3"×3" square. In one illustrative embodiment of this invention, step 70 may be implemented by the software marketed by Adobe under its trademark "Illustrator".

Figure 3D:
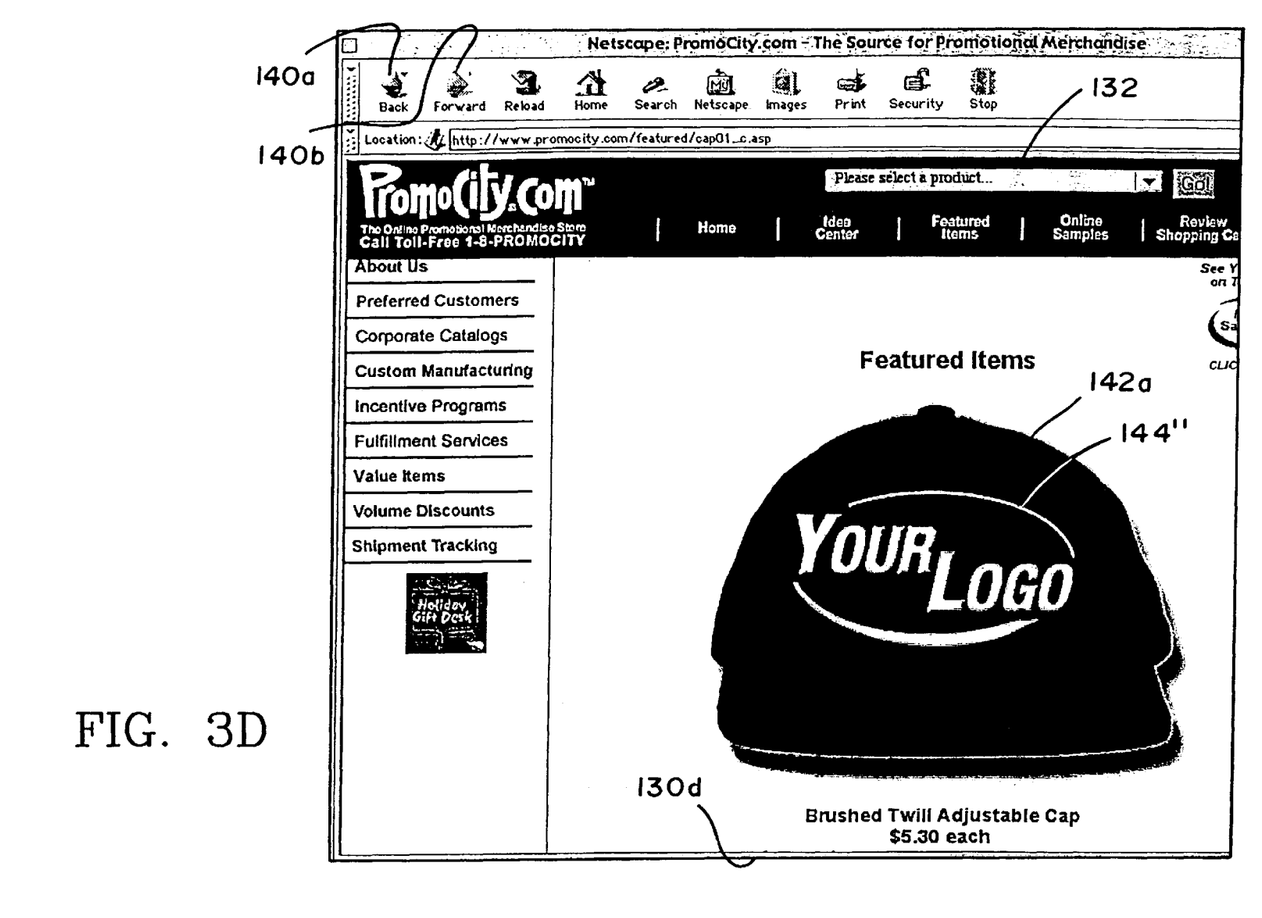
Figure 3E:
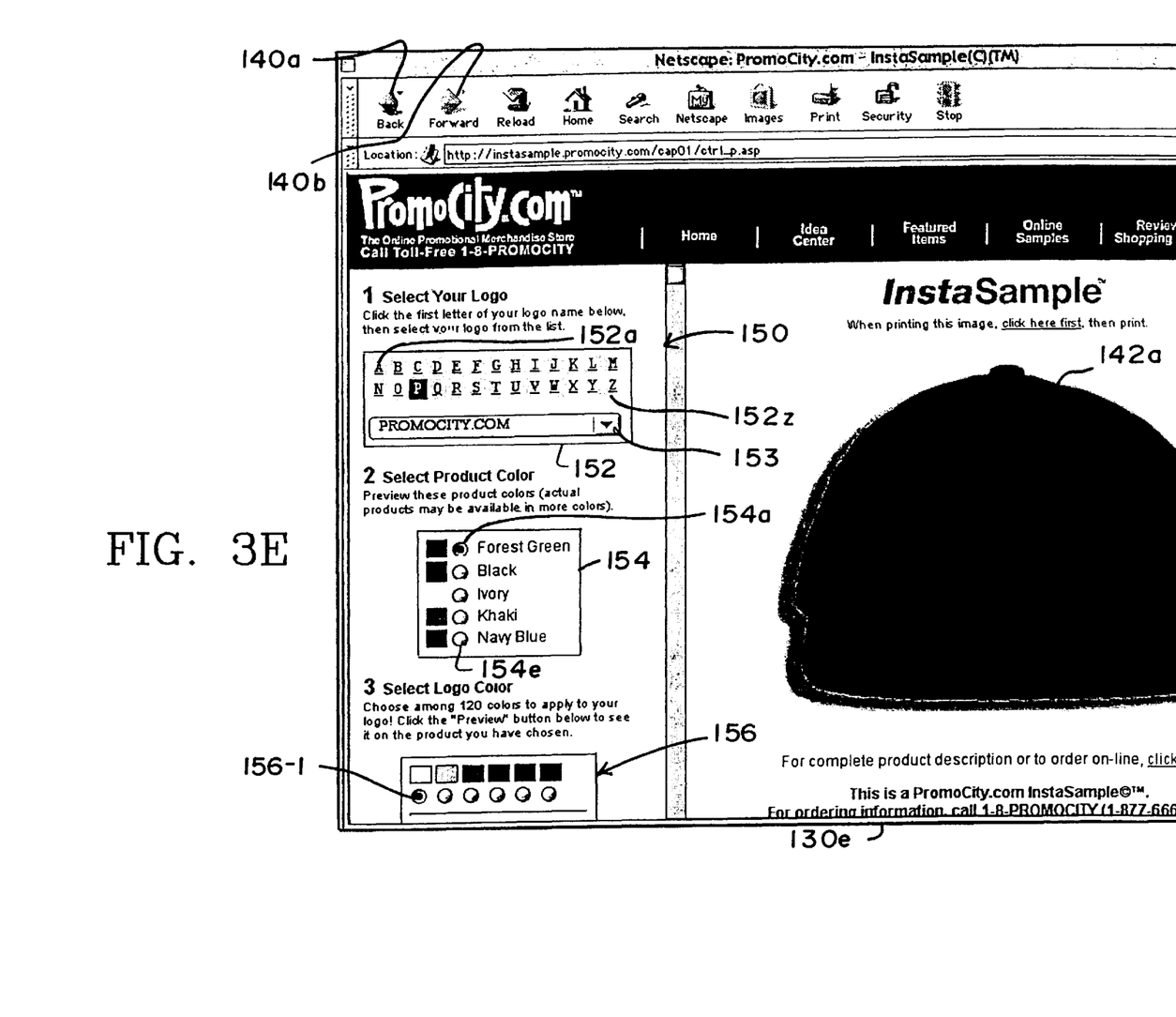

Next, a flash template data file such as that marketed by Macromedia is opened in step 74 for the logo data of the vector formatted EPS data. In one illustrative embodiment, step 74 creates 26 templates, one for each letter of the alphabet, whereby all of the logo images stored in one template begin with the letter that was assigned to that template. For example, all of the images of the logos 144 beginning with "A" are stored in the A template. In turn, step 76 compiles the logo templates into a SWT format, which is an executable format and is machine readable, i.e., is readily read and understood by computers. Then in step 78, the template is uploaded to the server system 18, as shown in FIG. 1, where the logo templates, that were created in the processing 32, are transmitted via a link 34b to the dynamic graphics server 18c, wherein they are stored in the logo template memory 40 as shown in FIG. 1. The logo template memory 40 may be considered a library of the available logo or second images. Similarly, the name of the logo 144 (which would not normally include the stylization of the logo) is identified and translated by step 72 into the HTML to permit the name to be incorporated into one of the web pages 24. In particular, step 78 uploads to the web server 18a the logo name to be included into a drop down panel, which bears the names of all of the logos 144 kept in the library stored in the logo template memory 40. A drop down panel of logo names may be displayed as will be described below by clicking on a panel 152 of the page 130e as shown in FIG. 3E.

Figure 2B:
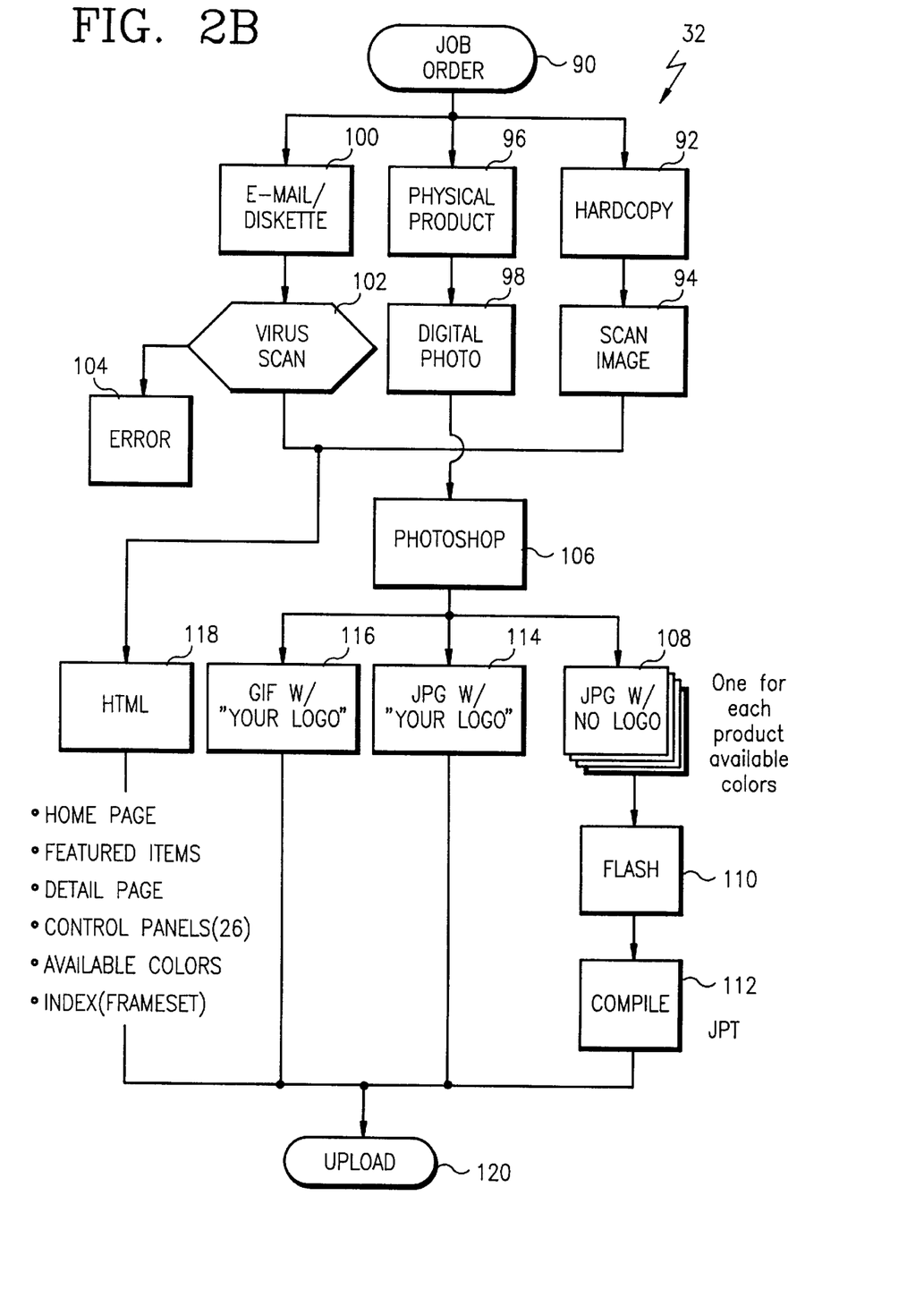

Referring now to FIG. 2B, there is shown a further part of the process 32 that was shown generally in FIG. 1. In particular, FIG. 2B illustrates the detailed steps of that process 32 for inputting and formatting data indicative of the first image, e.g., one of a plurality of the promotional products 142 which may be selected for processing. The product data is structured in an illustrative embodiment of this invention as a template, in which one of the first or product images is embedded. In turn, a plurality of product templates are stored as a library of the available promotional products memory 38, as shown in FIG. 1. The first or promotional product 142 image may be transmitted by different conduits to the site where the processing 32 is preformed. For example, a hard copy may be transmitted in step 92 to step 94, which scans the hard copy to output a raster image data file which represents the first image. Alternatively, the actual product 142 may be shipped in step 96 to the processing site, where step 98 obtains the first image by digitally photographing the product 142. In a still further embodiment, the first image of the product 142 may be Emailed in step 100 to the processing site, where step 102 scans the inputted image data to remove possible viruses; if step 102 fails to remove the virus, an error alarm is generated in step 104. The data outputted by each of the steps 94, 98 and 102 is applied to step 106, where the inputted data in digital, rasterized format is edited by an operator in preparation for inclusion into a flash template data file. In particular, the step 106 permits an operator to redraw, erase or change or adjust the color of the rasterized product image. The output of the editing is a series of layers. The bottom most image corresponds to the original unedited image. The uppers images are respectively a record of the changes to the image's configuration, the erased parts of the image and the color changes. Step 106 also permits the first or product image to be normalized to a standard configuration and size, e.g., a 400×400 pixel square. Finally, step 106 positions on the product image at least one "place holder" that identifies that point or points on a promotional product where a logo 144 may be positioned. With reference to FIGS. 3A, B, C, D and E, each of the products 142a, b, c and d has a single place holder for receiving a selected logo 142. In this example shown in FIG. 3E, the product 142 is a cap 142a and, typically, would include only one place holder due to its size and configuration. When the product 142 may accommodate a logo in more than one position, e.g., where the product 142 is luggage, more than one place holder may be assigned to such a product 142. It is contemplated that the present invention may include the capability to permit the purchaser to choose which of the available place holders where the selected logo 144 may be positioned relatively with respect to the promotional product 142.

The edited data from step 106 is applied to step 108, which translates the inputted rasterized data indicative of one of the promotional products 142 into JPG formatted data which retains its rasterized formatting and is interchangeable. As shown in FIG. 2B, the JPG data file is created with a plurality of layers, one layer for each of the colors in which a particular product is available. For example as shown in FIG. 3E, a promotional product in the form of a cap 142a is available in five colors, namely forest green, black, ivory, khaki and navy blue. In that example, step 108 would develop a JPG layer for each of these five colors. Next, a flash template data file is opened in step 110 for each of the JPG layers created in step 108. In step 112, an executable JPT template is compiled for each of the flash template data layers, e.g., one for each of the available colors.

In step 116, the rasterized image is converted into a composite image of the cap 142a and a generic logo 144' such as "Your Logo", which are GIF formatted and disposed as a featured item on the web page 130b of FIG. 3B. In step 114, the image rasterized data is converted to a JPG data format of a detailed image that is to be inserted on page 103d as shown in FIG. 3D and includes the product 142 with the generic logo 144', "Your Logo" superimposed thereon and is similar to the menu web page 130b; in particular, this composite image as shown in FIG. 3D is larger and more detailed than that of the composite image appearing as the featured item in the web page 130b of FIG. 3B. In step 118, the digital rasterized image derived from any of the steps 102, 98 and 94 is translated in step 118 into the HTML language to permit the product data to be imbedded into one of the pages 130, whereby an image of the promotional product 142 would appear on the home page 130a of FIG. 3A, the featured items page 130b of FIG. 3B, a detailed page 130d as shown in FIG. 3D, and the control panels 154 and 156 as shown on the InstaSample pages 130e and f of FIGS. 3E and F respectively.

Referring now to FIG. 4, there is shown the steps of the process 160, whereby the purchaser may initiate from the browser 12 of his/her client system 10, as shown in FIG. 1, a communication session or conversation between the client system 10 and the server system 18, whereby the purchaser can select one of the available promotional products 142 that are stored as a library in the product template memory 38, the color of the selected product 142, one of the available logos 144 that are stored as a library in the logo template memory 40, the color of the selected logo 144 and the relative size of the selected logo 144 with respect to the product 142. Starting in step 162, the purchaser logs on at his/her browser 12 to the website associated with the server system 18, whereby the home page 130a, as shown in FIG. 3A, appears on a display (not shown) of the browser 12. Next in step 164, the purchaser clicks on the "featured item" link 136, whereby the featured items page 130b, as shown in FIG. 3B, appears on the browser screen. The page 130b bears a number of links 180-1, 180-2—180-n, which may be clicked on by the purchaser to bring up images of the corresponding items or promotional products 142, e.g., apparel, bags & duffels, etc., known as "featured items". In the illustrative embodiment of FIG. 3B, the purchaser has clicked on the link 180-1 and images of apparel, i.e., the cap 142a with the generic logo 144' superimposed thereon and a shirt 142d with the generic logo 144' superimposed thereon, are displayed. In turn, there is another set of links 182-1 and 182-2. Links 182-1 and 182-2 are associated with the cap 142a and the shirt 142d respectively. The purchaser may then select one of displayed products 142 on page 130b by clicking on that product's links 182, whereby the web page 130e is drawn up; as illustrated in FIG. 3E, the selected promotional product 142, in this instance the cap 142a, is displayed without any logo 144 in an enlarged and more detailed image of the cap 142a than that shown in FIG. 3B.

Figure 3F:
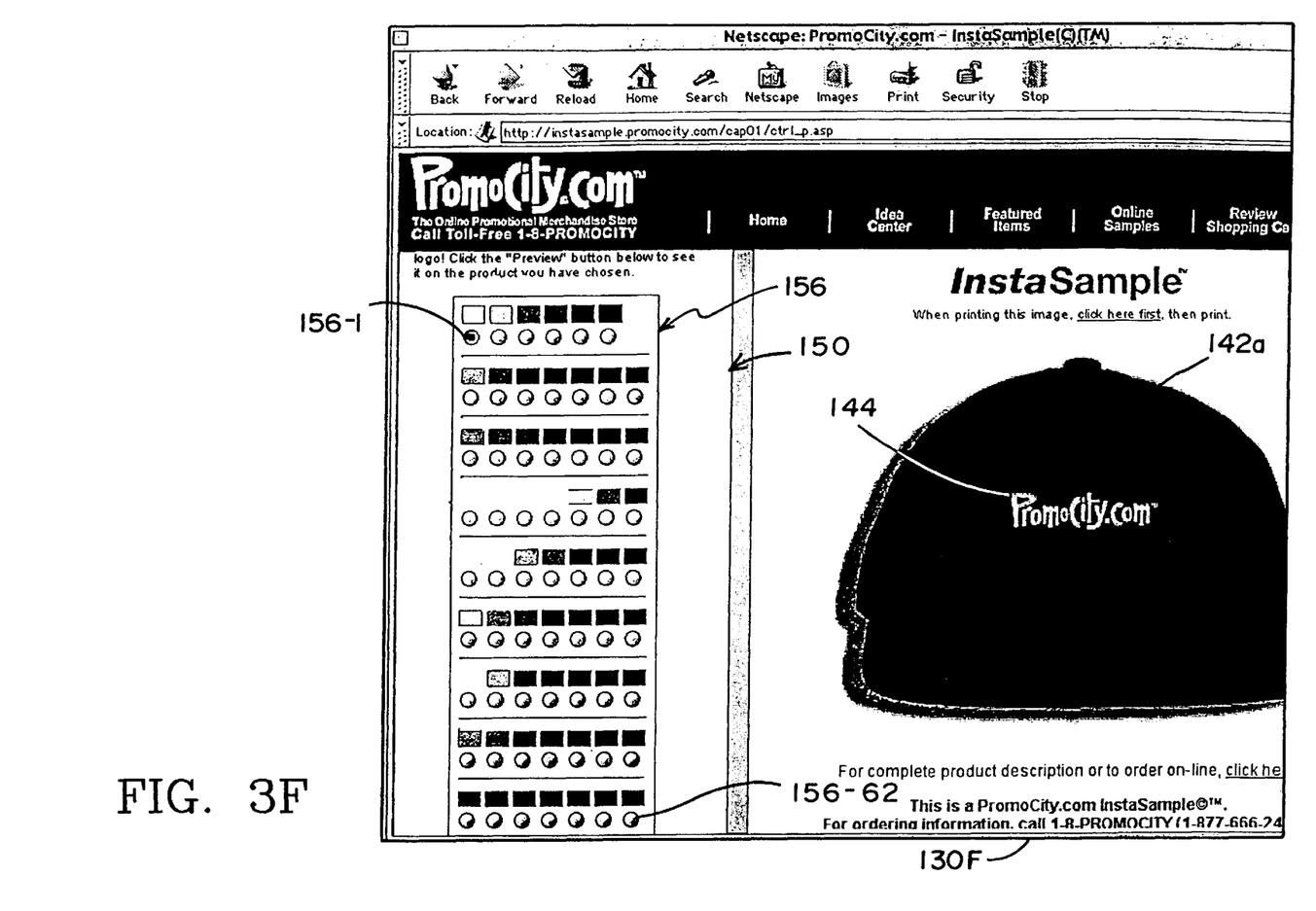

At this stage of the process as shown in FIG. 3E, the image of a logo 144 is absent and has not yet been selected or superimposed on the cap 142a. Next in step 166, the purchaser makes his/her choice of the logo 144. As shown in FIG. 3E, the web page 130e includes a panel 152, which in turn comprises a set of keys 152a–z. The purchaser cliques on one of the keys 152, which corresponds to the first letter of the logo 144 to be selected and a list of the logos beginning with the selected letter will appear in the block 153. In turn, the purchaser may scroll through the logos 144 appearing in the block 153 until the logo 144 of choice appears; the purchaser then clicks on the selected logo 144 appearing in the block 153, whereby the selected logo 144, e.g., "PromoCity.com", will be superimposed on the cap 142a, as shown in FIG. 3F.

Still in step 166, the purchaser may choose among the available colors for the selected product 142, e.g., the cap 142a, by clicking on a selected one of the plurality of keys 154a–e, which correspond in one illustrative embodiment respectively to the following colors: forest green, black, ivory, khaki and navy blue. When the purchaser clicks on a particular key 154a–e, e.g., 154b, the color of the cap 142a will be rendered as black. The purchaser then selects the desired color of the logo 144 by actuating one of the plurality of keys 156-1 to 156-120 within a box 156 of the web page 130f, as shown in FIGS. 3E and F. It is apparent that the number of colors available for the image of the logo 144, e.g. 120, is much greater than the number of colors available for the promotion product 142, e.g., 5. This typically is necessary, because each logo 144, which corresponds to a particular entity, will have a unique shade or intensity of color, and it is contemplated that a wide variety of colors will be necessary to provide the proper color to the logo 144 to match that color which is normally associated that logo 144. For example, the trade dress of Kodak includes a unique shade of an orange gold.

After the promotional product 142 has been selected by the purchaser, the product's color, the logo 144, and the logo's color have been selected by the purchaser, the process 160 moves to a generator process 168, where a JPG file representative of the second image superimposed on the first image, i.e., the logo image superimposed on the product image, is generated. The software for effecting the generator process 168 comprises in a generator 42, which as shown in FIG. 1 resides in the dynamic graphics server 18c. As will be explained below, the generator process 168 processes the selected product and logo templates that were accessed from the product and logo template memories 38 and 40 in steps 164 and 166, as described above. First, the generator process 168 executes an active server page (ASP) file which contains the color attributes of the product 142 and the logo 144 and inserts the selected colors for the selected product 142 and logo 144 into their respectively accessed templates. At this stage, the product data is in a rasterized format, while the logo data is in a vector format. Next, the generator process 168 inserts the logo image data into the product template. This insertion step effects the superimposing of the logo image on the product image, and at the same time, adjusts the relative position of the logo with respect to the product, i.e., the logo is placed in the place holder that was affixed to the product. The insertion step also causes the product and logo images to be painted respectively with the selected colors, and the size of the logo image to be adjusted with respect to that of the product in accordance with a scaling factor. In one illustrative embodiment, the scaling factor represents the degree or % of downsizing from the full sized logo stored on its template. Alternatively, the scaling factor could also represent an increase in the size of that image stored on its template without departing from the teachings of this invention. When the product 142 was selected in step 164 as described above, the corresponding template bearing that product 142 as was constructed in step 112 of FIG. 2B is retrieved from its library in the product template memory 38 of the graphic server 18c as shown in FIG. 1. When the logo 144 is selected in step 166 above, its template bearing the logo in the SWT data format is withdrawn from its library in the logo template memory 40 and is applied to the template bearing the product 142.

ASP files instruct the server software as to which of the selected logo colors and product colors have been chosen and to execute the graphic server 18c based on software programming contained in the generator 42 to paint the logo image and the product image respectively with those colors that have been previously selected. The ASP control panel files may be coded in a number of different conventions to provide a wide variety of colors. In one illustrative embodiment, a particular color may be represented by the parameters R, G and B that represent respectively the primary colors: red, green and blue. A numerical value in the range of 0 to 255 that is representative of the intensity of a color is assigned to each of the primary colors. In an alternative embodiment that is often used in the printing industry, a particular color is defined in terms of: cyan C, magenta M, yellow Y and black K. Other standards that could be used by this invention include the Pantone (Commercial) Standard or the Web-Hex Standard, which involves a set of 6 alpha-numeric characters. All color definitions may be converted to RGB. To achieve a more precise rendering of colors on a cathode ray tube as may be used with the browser 12, correction factors may be employed with the above listed color coding conventions. The above described and other color coding standards or conventions of color coding could be used without departing from the teachings of this invention. The ASP control panel files with the selected color coding for the logo images is also included with the library of logo templates stored in the logo template memory 40.

The completed product template includes the first or product image, the place holder or other equivalent code that determines where on the product image that the logo image has been placed, the adjusted scaling factor that indicates the size of logo image relative to that of the product image, and data from the ASP control panel files that sets the color for each of the selected product and logo images. The product image data, that is retained on the template, is in a rasterized format, whereas the logo image data inserted into this template is in a vector format. Next the generator process copies the logo and product images, along with their color data, product frame and the scaling factor, and merges this data to a third file of a JPG format. In particular, the product data of a JPG format, i.e., a raster format, merges with the logo data of a SWT, i.e., vector data format, whereby the superimposed logo data merges to a rasterized JPG file.

After the product template has been executed in step 168, the resultant JPG file produced in step 168 to represent the composite image is embedded into one of the webpages 24, as shown in FIGS. 3A–F. Next in step 170, the page 130 bearing the superimposed image embedded therein is returned to that client system 10 which initiated the image selection and superimposing in step 162. Typically, the returned page 130 is presented on a display associated with the browser 12, whereby the purchaser may preview the composite images of the logo 142 superimposed on the product image 144, before purchasing the selected product 144. The purchaser may print out in step 172 a copy of the superimposed images, thereby providing the purchaser or end user with a physical or hard copy of the superimposed images which may be readily given to sales prospects. Thereafter, the image constructing session is terminated in step 174.

Although the present invention has been described in terms of various embodiments, it is not intended that the invention be limited to these embodiments. Modification within the spirit of the inventions will be apparent to those skilled in the art. For example, the process of constructing a template may be readily modified to permit the purchaser from his/her browser to adjust the scaling factor, whereby the size of the logo image may be increased or decreased under the control of the purchaser. Similarly, the constructing process may be enhanced within the teachings of this invention to permit the purchaser to selectively place the position of the place holder on the product image and/or to set a plurality of place holders on the product image, whereby the logo may be placed in any of a number relative positions on the promotional product under the control of the purchaser. Still further, the logo image may be segmented and color values could be selected for each of the established segments. In addition, a cookie that would identify a particular customer and an indication of the previous choices made by that purchase, e.g., the favorite color or colors of that customer, may be stored in the customer database 26 as shown in FIG. 1. The scope of the present invention is defined by the claims that follow.

I claim:

1. The method of preparing a server to support a client system to construct a composite image, the component parts of said composite image comprising first and second images, said method comprising the steps of:

a) constructing at the server first and second libraries;

b) inputting to the server data representative of sets of said first and second images, each of said second images having a periphery and data representative of the relative position of first and second points, said first and second points lying on said periphery of said second image;

c) generating from said data representative of said second images said set of said second images, and loading said set of said second images into said second library; and d) generating from said data representative of said first images said set of said first images and loading said set of first images into said first library.

2. The method of preparing a server as claimed in claim 1, wherein there is further included the step of formatting the data of said first images as an array of pixel elements.

3. The method of preparing a server as claimed in claim 1, wherein there is further included a step of configuring each of said second images as a logo.

4. The method of preparing a server as claimed in claim 1, wherein there is further included a step of configuring said second image as a logo, and a step of configuring said first image as a product.

5. The method of preparing a server as claimed in claim 2, wherein there is included a plurality of said formatted second images and there is included a step of storing said plurality of said formatted second images in the second library.

6. The method of preparing a server as claimed in claim 2, wherein there is further included the step of responding to the positional data of said second image to represent said second image as an array of pixels.

7. The method of preparing a server as claimed in claim 6, where there is further included a step of merging said array of pixels related to said second image, whereby said second image is superimposed on said first image.

8. The method of preparing a server as claimed in claim 7, wherein there is further included a step of configuring said second image as a logo, and said first image as a product.

9. The method of preparing a server as claimed in claim 1, where there is included a step of setting said first image to a default color.

10. The method of preparing a server as claimed in claim 9, wherein there is further included a step of setting said second image to a default color.

11. The method of preparing a server as claimed in claim 10, there is further included the step of providing first and second parameters for setting said default colors of said first and second images respectively.

12. The method of preparing a server as claimed in claim 1, wherein there is included a step of disposing at least one placement hook on said first image to facilitate the superimposing said second image on said first image in a desired relationship to said first image.

13. The method of preparing a server as claimed in claim 12, wherein there is included a further step of representing said second image as a logo and said first image as a product, whereby said one placement hook may be used to position said logo on said product.

14. The method of preparing a server as claimed in claim 1, wherein there is further included the step of normalizing the dimensions of said second image and storing said normalized second image in the second library.

15. The method of preparing a server as claimed in claim 14, wherein there are a plurality of said second images, said step of normalizing normalizes the dimensions of each of said plurality of said second images, and storing said plurality of said normalized images in said second library.

16. The method of preparing a server as claimed in claim 1, wherein said first image represents a promotional product, said second image represents a logo and said composite image is said logo superimposed on said promotional product.

17. The method of preparing a server as claimed in claim 1, wherein there is further included a step of creating and storing in memory a set of first parameters that defines a certain characteristic of said set of said first images.

18. The method of preparing a server as claimed in claim 17, wherein there is further included a step of creating and storing in memory a set of second parameters that defines a certain characteristic of said set of said second images.

19. The method of preparing a server as claimed in claim 18, wherein said set of said first parameters define color.

20. The method of preparing a server as claimed in claim 19, wherein said set of said second parameters define color.

21. The method of preparing a server as claimed in claim 18, wherein said second parameter defines the relative size of said second image as compared to the size of said first image.

22. The method of preparing, a server as claimed in claim 17, wherein there is further included a step of preparing a webpage bearing a set of keys designed to be clicked on by a user at the client system to select one of said set of first parameters to define a corresponding characteristic of said first image.

23. The method of preparing a server as claimed in claim 1, wherein there is further included the step of preparing a webpage bearing indicia designed to be actuated by a user of the supported client system to select one of said set of said second images and to embed the selected second image into said webpage to be downloaded to and displayed by the supported client system.

24. The method of preparing a server as claimed in claim 23, wherein there is further included the steps of creating and storing in memory a set of parameters that defines a certain characteristic of said second image and of preparing a second webpage bearing indicia designed to be actuated by the user of the supported client system to select one of said set of said second parameters to define that characteristic of said selected second image.

25. The method of preparing a server as claimed in claim 24, wherein said parameter defines the particular color of said second image.

26. The method of preparing a server as claimed in claim 24, wherein there is further included the step of preparing a third webpage bearing indicia designed to be actuated by the user of the supported client system to select one of said set of said first images and to embed said selected first image into said third webpage to be transmitted to and displayed by the supported client system.

27. The method of preparing a server as claimed in claim 26, wherein there is further included the steps of creating and storing in memory a set of second parameters that defines a certain characteristic of said corresponding first images and of preparing said third webpage to bear further indicia to be actuated by the user of the supported client system to select one of said set of first parameters to define that characteristic of the selected first image.

28. A server adapted to support a client system to generate a composite image, the component parts of said composite image comprising first and second images, said server comprising:
   (a) a programmed processor for receiving and responsive to data representative of a set of said second images to generate a corresponding set of templates, each template bearing a corresponding one of said set of said second images;
   (b) a second library for storing said set of templates;
   (c) a first library for storing data representative of a set of said first images; and
   (d) said programmed processor facilitating a communication session with the supported client system to permit the user of the client system to select one of said set of said first images and one of said set of said second images, said programmed processor responsive to the user selection of one of said set of said second images to access from the second library that template said selected second image and to the user selection of one of said set of said first images to add said selected first image to said selected template.

29. The server adapted to support a client system as claimed in claim 28, wherein there is further comprised a memory for storing at least one webpage bearing indicia designed to be actuated by a user of the supported client system to select a corresponding one of said set of said second images, said programmed processor responsive to the actuation of one of said indicia to select the corresponding one of said set of said second images for embedding said selected second image into said webpage to be transmitted to and to be displayed by the supported client system.

30. The server adapted to support a client system as claimed in claim 29, wherein said memory stores a set of parameters, each of which defines a certain characteristic of said corresponding second image and a second webpage bearing indicia designed to be actuated by the user of the supported client system to select one of said set of said parameters to define that characteristic of said selected second image, and said programmed processor is programmed to respond to the actuation of an indicia of said second webpage corresponding to a selected one of said set of said parameters to set that characteristic of said second image.

31. The method of operating a client system and a server to construct a composite image, the components of the composite image comprising first and second images, first and second libraries being provided at the server to store respectively sets of the first and second images, said method comprising the steps of:

a) establishing a communication session over a communication link between the server and the client system;
 b) facilitating a user at the client system during the course of said communication session to select from the first library a selected one of said set of first images;
 c) facilitating the user at the client system during the course of said communication session to select from the second library a selected one of said set of second images;
 d) accessing at the server from the first and second libraries said selected ones of said first and second images;
 e) superimposing at the server said selected one second image on said selected one first image to provide said composite image; and
 f) transmitting from the server to the client system said composite image.

32. The method of operating a client system as claimed in claim 31, wherein said selected one first image comprises a promotional product, and said selected one second image comprises a logo, and there is further included a step of displaying at the client system said composite image as a logo superimposed on a promotional product.

33. The method of operating a client system as claimed in claim 31, wherein there is further included a step of creating a parameter that defines a certain characteristic of at least one of said first and second images.

34. The method of operating a client system as claimed in claim 33, wherein said creating step creates a set of parameters that define certain characteristics of said one image, and there is further included the steps of creating a webpage that presents a set of keys corresponding to said set of parameters, and transmitting said webpage to the client server, whereby the user may click on a desired one of said set of keys to select a corresponding one of said set of parameters.

35. The method of operating a client system as claimed in claim 33, wherein said parameter relates to the color of said first image.

36. The method of operating a client system as claimed in claim 33, wherein said first mentioned parameter defines the certain characteristic of said first images, and there is further included the step of creating a second parameter that defines a certain characteristic of said second images.

37. The method of operating a client system as claimed in claim 36, where the certain characteristic is color.

* * * * *